Patented Apr. 27, 1948

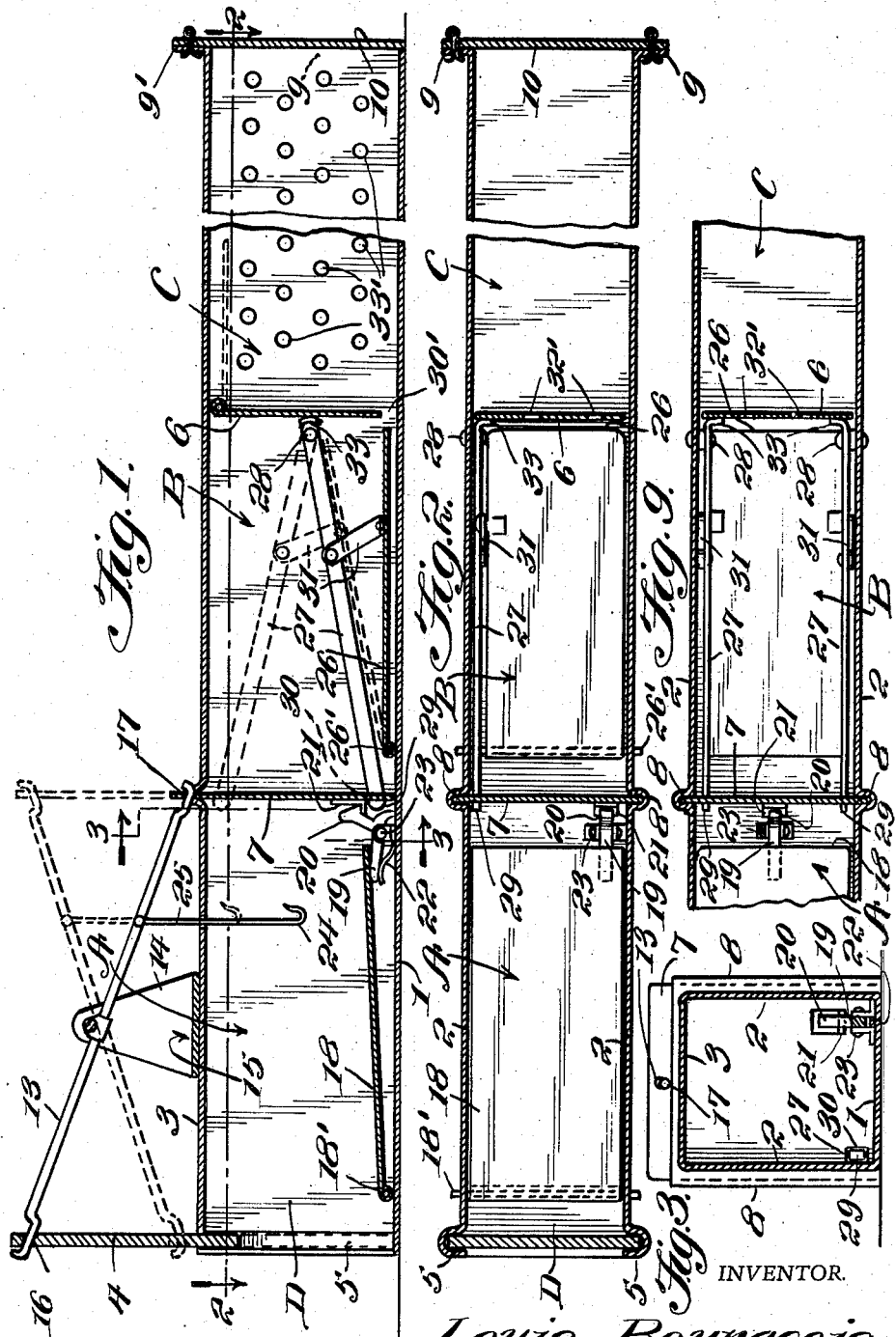

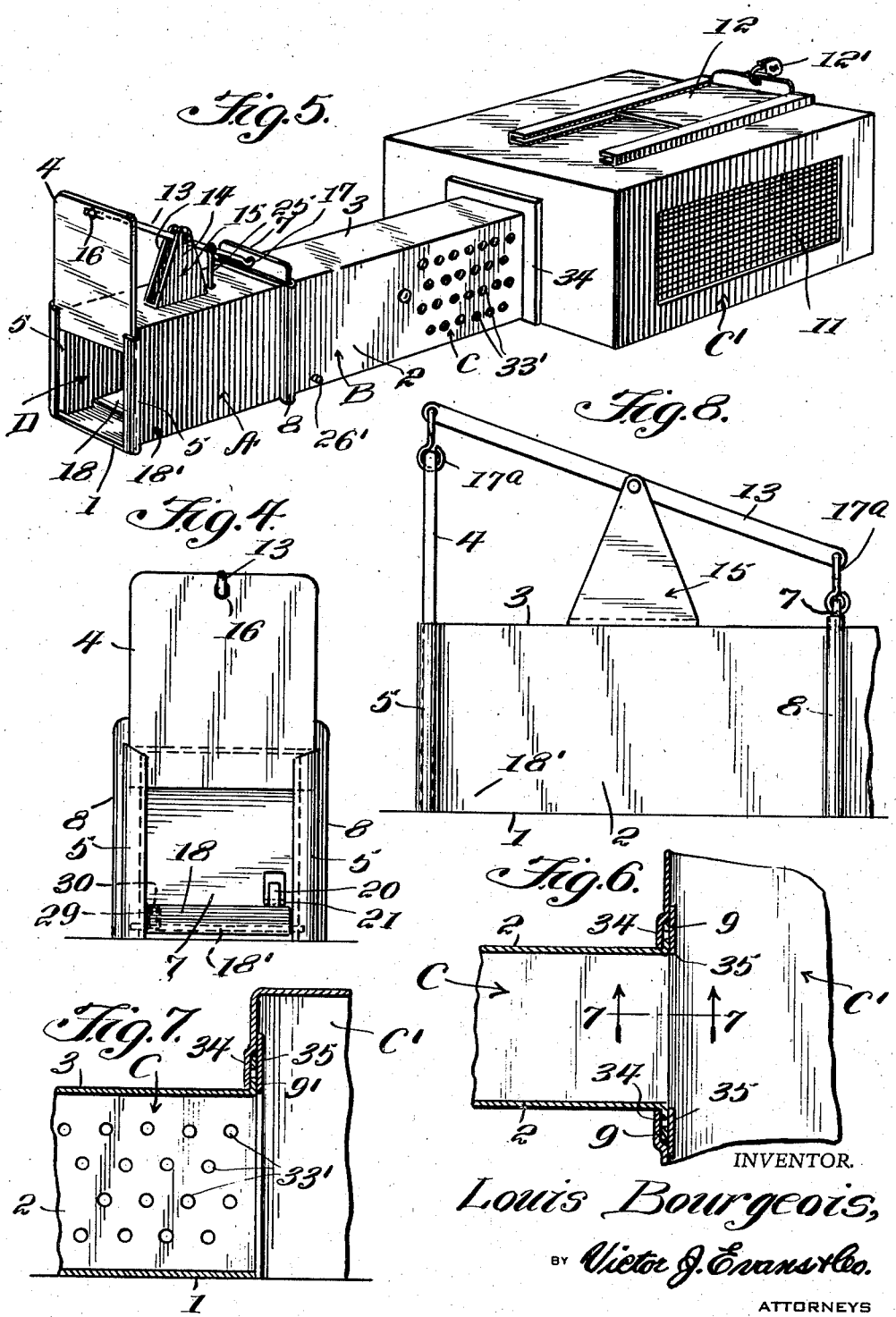

2,440,570

UNITED STATES PATENT OFFICE 2,440,570

TRAP

Louis Bourgeois, St. Louis, Mo.

Application January 4, 1945, Serial No. 571,331

5 Claims. (Cl. 43—76)

My present invention, in its broad aspect, has to do with improvements in self-setting traps for all types of animals, and the provision in connection therewith of successive compartments, including a final compound or jail so that a number of animals may be trapped and contained in the trap. For instance, my trap may be made in any size so that not only small animals may be trapped and retained, but larger animals such as wolves, coyotes, and fur bearing animals, such as silver foxes, and white, red and gray foxes may be trapped. Smaller forms of my trap may be used for rodents such as squirrels, rats, rabbits and the like. The animals are trapped and retained alive, and the weight of the animal, rather than the usual trigger action of bait, traps the animal and resets the trap; in my invention, the bait merely constitutes a lure.

Among the many objects and advantages of my invention are: first, to provide an improved and unique lure trap for all sorts of animals, wherein means are provided for resetting the trap after each successive animal is trapped; second, to detain such trapped animals alive in a suitable receptacle forming part of or connected to the trap to serve as a compound or jail for multiple animals after passing through the trap proper and successively resetting it; third, for defining multiple chambers adapted to communicate successively with each other by the action of said animal for the passage therethrough of the trapped animal; fourth, for alternately operating movable partitions defining such multiple chambers in said trap by the weight of the animal passing through it so as to prevent his retreat and allow him to pass into a succeeding chamber; and fifth, other objects and construction details hereinafter more fully described and claimed.

In the accompanying drawing in which like reference numerals indicate corresponding parts:

Figure 1 is a sectional side elevation of my invention;

Figure 2 is a longitudinal section on the line 2—2 of Figure 1;

Figure 3 is a transverse section on the line 3—3 of Figure 1;

Figure 4 is a front elevation;

Figure 5 is a perspective view of my trap and the compound or jail;

Figure 6 is a section showing the manner of connecting parts A and B of my trap by interfitting flanged parts C.

Figure 7 is a section on the line 7—7 of Figure 6;

Figure 8 is a detailed view of my trap door operating mechanism with a modified form of connection to the operating lever, and Figure 9 is a section of a modified form of means for holding the inner swinging door against accidental opening.

Referring to the drawing, the numeral 1 indicates a bottom wall, 2, the sides, and 3, the top wall of a rectangular tubular box comprising the trap proper.

This box is provided with an entrance or front door 4, preferably slidable vertically in inturned flanges forming grooves 5 at the front ends of the side walls as illustrated; and a movable partition 6, preferably hinged near the top wall and spaced from the rear end of said box. Intermediate between the front door and said partition 6 is another partition 7, preferably slidingly mounted in grooves 8 formed by a U-shaped bend in the side walls of the box and extending above the top wall 3, as shown in Figure 2.

The rear end of the box is provided with flanges 9 at the side walls and a flange 9' at the top wall adapted to secure thereto a wall 10 so as to form a chamber C at the rear end of said box for receiving the trapped animals that have passed the partitions 6, 7 after entering the door opening D as will be later described.

This chamber C is large enough to contain one or more of the trapped animals when the box is used by itself, but in order to provide a larger chamber, a box C', Figure 5, is attached to said flanges 9 and 9' as shown in the perspective view Figure 5. This jail receptacle or compound is provided with a wire screen 11 or otherwise adapted to supply air to the trapped rodents therein. Said jail C' also has a sliding lid 12 provided with a staple and padlock 12' for securing it when in operation, and permitting the removal of trapped animals therefrom.

The front door 4 and the partition 7 define a chamber A, and a similar chamber B is defined by the partitions 7 and 6.

Means for operating the front door 4 and partition 7 alternately preferably consists of an oscillating bar 13 pivotally mounted between the spaced upstanding parts 14 of a vertical bracket 15 or standard mounted on the top wall 3 above the chamber A. The ends of said bar engage openings 16 and 17 respectively in the door 4 and partition 7 and are curved downwardly and upwardly at said ends as shown in Figure 1, to compensate for the sliding movement of the respective partitions upon said bar, during the oscillation of the bar upon its pivot between the parts 14 of the bracket 15, as indicated in Figure 1.

Any other suitable connection to effect such compensation between the vertically moving partitions and ends of the oscillating bar, may be employed, such as a double eye link, 17A shown in the modified form of Figure 8.

The alternate movement of said door and partition 7 is effected by the weight of the animal entering the door opening and preceding along a plate 18 pivoted as at 18' at its front edge close to the bottom wall 1 and slightly inclined upward towards the rear as shown in Figures 1 and 2. The rear end of said plate engages one end 19 of a bell-crank lever, the other end 20 of which has a catch adapted to engage a lip 21 secured to the partition 7, and normally maintained in engagement by a plate spring 22 under the arm 19 to raise said arm about the pivot 23 of said lever. The door 4 is heavier than the partition 7, thus it tends to close, and when the animal proceeds inward along the plate 18 towards the bait suspended by a hook 24 at the end of a connection 25 attached to the rear arm of said bar 13, said bell-crank lever is tripped and frees the partition 7. The greater weight of the door 4 automatically causes the door 4 to move downwardly by force of gravity in the guides 5 and thereby closes the door and opens at the same time the partition 7 which is raised as indicated by dotted lines in Figure 1.

This lifting of the rear arm of the bar 13 likewise lifts the hook and bait towards the top wall 3. The retreat of the animal thus trapped in the chamber A by the descent of the door 4, is thus cut off, but the lifting of the partition 7 as just described, allows him to pass into the middle chamber B by his natural inclination to go forward when he sees his retreat has been cut off.

Another plate 26 is pivoted as at 26' at its front end in the side walls and normally lies substantially horizontal and close to the bottom wall 1 as shown in full lines in Figures 1 and 2. At one (or both side walls as is shown in the modified form of Figure 9) is mounted a lever 27 pivoted at 28 to the side wall as shown in Figure 2. The front end 29 of said lever extends through a slot 30 (Figure 1) near the bottom of said partition 7 so that when the said partition rises as above described, this lever assumes the dotted position in said chamber B as shown in Figure 1. A link 31 is pivoted at its upper end to said lever 27 and is connected at its lower end to said plate 26. Thus when the partition 7 is raised by the descent of the door 4, the said lever 27 is likewise raised to the dotted position Figure 1, and by its connection with the plate 26, the latter is likewise inclined as indicated by dotted lines in Figure 1.

Thus, the animal passing under the raised partition from the chamber A into the chamber B, will proceed forward upon the plate 26 in its inclined position as stated. The weight of the animal upon the plate 26 will cause it to descend from its inclined to its horizontal position, and the link 31 will cause the descent of the lever 27 from its dotted position to its full line position in Figure 1, and thereby lower the partition 7 so that the lip 21 thereon, engages the end 20 of the bell-crank lever before described. Such descent of the partition 7 under the influence of the weight of the animal upon the plate 26, overcomes the tendency of the door 4 to close, and therefore, it rises to the open position of Figure 1 and is held in such re-set position by the said catch and its engagement with the lowered partition 7. The animal is thus detained in the chamber B since the lowered partition 7 prevents his retreat into the front chamber A.

The hinged partition 6 between the chambers B and C allows light to pass into the chamber B below the bottom edge 30' of said swinging partition or otherwise through perforations 32' which naturally will induce the animal in chamber B to push against the swinging partition 6 and enter the rear chamber C. His return into the chamber B is prevented by a stop, such as the out-turned end 33 of the adjacent end of the lever or levers 27 which will prevent the swinging movement of the partition 6 towards the front, if the animal should endeavor to retreat after entering the chamber C as just described. The sides of the chamber C have perforations 33 for inlet of air as shown in Figures 1 and 7, and such chamber when having the end closure 10 before mentioned, is ordinarily sufficient for containing the animal trapped in said box. However, since I have recently found six hares trapped in said chamber C, I have provided a larger receptacle by means of the box C' (Figure 4) previously described, which may be attached in place of the end closure 10 when animals of the size of hares or the like are desired to be trapped.

Thus it will be evident that successive animals can enter the door opening of said trap proper, trip the catch by their weight upon the plate 18, causing the descent of the door 4 and the lifting of the partition 7; then as they proceed onward upon the plate 26 in its inclined position as described, their individual weight will lower the partition 7 and raise the front door and re-set the trap for the succeeding animal to enter and likewise trap himself. Since each animal will naturally seek to escape towards the light from the chamber C, which he will regard as an exit from the chamber B, the trapped animals will congregate in the chamber C, or the larger chamber C' which is preferred for the larger animals, while the chamber C is the preferred receptacle for the smaller animals.

It is evident that this self-setting animal trap is preferably constructed of various sizes according to the kind of animal that it is desired to trap.

The trap proper and the jail receptacle or compound C', are preferably of metal such as galvanized sheet iron, to keep the trapped animals from gnawing their way out of the chambers C—C' where they are collected after passing through the chambers A and B and operating the trap as above described. While I have illustrated various features of construction in carrying out the principle of my invention, I do not limit myself to the construction shown except by the appended claims.

The baited hook is only to toll or lure the animals inward along the plate 18, and the trap does not have the usual trigger action. The weight of the individual animal upon the actuating floor-plate 18 effects the closing of the door 4, which acts by its downward movement, to lift the inner partition 7 through the operative connections between the pair of partitions 4 and 7.

The larger jail receptacle C' is attached to the trap proper by sliding the flanges 9 and 9' upward inside flanged parts 34 of the adjacent wall of the larger jail receptacle and securing them thereto by bolts 35 as indicated in Figure 6. By removing said bolts, the major portion of the length of the trap proper can be slid back into the jail receptacle C' and the size of the device much reduced to facilitate packing and transportation.

Having thus fully described my invention, what I claim as new and desire to protect by Letters Patent, is:

1. An animal trap, comprising a hollow rectangular box having a slidingly movable door and transverse partition positioned respectively at the front end and at an inner or intermediate position in said box and adapted to be disposed alternately in open and closed positions, operative connections between said door and said partition, the door having a greater weight than the partition and having a tendency to close and simultaneously to open the partition through said operative connections, a catch for said door to hold the door open against said closing tendency, means actuated by the weight of an animal thereon to trip said catch and allow the door to close and cause the partition to open, a lever positioned rearward of and operatively connected to said partition so as to rise and descend therewith, and means connected to said lever and actuated by the weight of an animal to cause its descent and pull down the partition and thus simultaneously lift the door and thereby re-set the trap, substantially as described.

2. An animal trap, comprising a hollow rectangular box having a slidingly movable door and transverse partition positioned respectively at the front end and at an intermediate position between the ends of said box and adapted to be disposed alternately in open and closed positions, operative connections between said door and said partition, the door being of greater weight than the partition and having a tendency to close and simultaneously to open the partition through said operative connections, a catch for said door to hold the door open against said closing tendency, means actuated by the weight of an animal thereon to trip said catch and allow the door to close and cause the partition to open, a pivoted plate horizontally disposed near the floor rearward of said partition, and a lever operatively connecting said plate and partition adapted to be lifted by the ascent of the partition and incline said plate upward, whereby the weight of an animal on the said plate when inclined will cause its descent to pull down the partition and simultaneously raise the door to open position and thus re-set the trap, substantially as described.

3. An animal trap, comprising a tubular rectangular box having a pair of vertically slidable transverse partitions positioned as a door at the front end and at an intermediate position respectively in said box, operative connections between said pair adapted to raise and lower the pair respectively alternately, the front partition having a normal tendency to move downward to closing position and tending simultaneously to raise the inner partition to open position, a bell-crank lever adjacent the inner partition and normally engaging a lip thereon, to hold it from rising under the influence of the front door, and an inclined floor-plate pivoted at its front end and engaging said lever at its rear end and adapted to trip said catch under the weight of an animal thereon to open the inner partition and simultaneously close the front partition, substantially as described and a second inclined plate inwardly of and connected to said inner partition to pull down said partition and simultaneously raise the door to reset the trap.

4. An animal trap, comprising a tubular rectangular box having a vertically sliding door at the front end, a hinged partition near the rear end, and an intermediate movable partition thus forming a middle chamber and another chamber in successive communication, operative connections between said door and intermediate partition adapted alternately to lower and raise said door and intermediate partition respectively, trip mechanism actuated by the weight of an animal in the front chamber for said operative connections adapted to lower the door and simultaneously raise the intermediate partition, a lever engaging said intermediate partition and raised thereby, and means in said middle chamber to pull down the intermediate partition and simultaneously raise the door to re-set the trap, the said hinged partition being adapted to swing rearward only by contact with the animal to admit the animal to the rear chamber and prevent his retreat therefrom, substantially as described.

5. In a trap, comprising a hollow elongated body, partitions in said body dividing the body into compartments, certain of said partitions being slidably mounted, a rocking bar pivoted above the trap, a slidable partition pivotally connected to each end of the rocking bar, a pivoted floor element upon which an animal is adapted to tread on entering the trap, a latch connected with the floor and engaging one of the sliding partitions, and one of said sliding partitions being heavier than the other to close one partition by gravity and open the other when the catch is released, a bracket mounted on the trap having spaced upwardly extending parts between which the rocking bar is pivoted between its ends, said latch being spring-pressed to a latching position when weight is removed from the floor, the latch having an arm moving the floor to inclined operative position when the latch is in latching position, one of said partitions being hinged and having its lower end spaced from the floor of the trap, a second pivoted floor element to be engaged by the animal, and lever connections to close the inner and lighter partition and open the outer and heavier partition.

LOUIS BOURGEOIS.

REFERENCES CITED

The following references are of record in the file of this patent:

UNITED STATES PATENTS

| Number | Name | Date |
|---|---|---|
| 621 | Kell | Mar. 3, 1838 |
| 214,013 | Willford | Apr. 8, 1879 |
| 431,856 | Smith | July 8, 1890 |
| 971,530 | Draper | Oct. 4, 1910 |
| 1,180,654 | Kirk | Apr. 25, 1916 |
| 1,349,453 | Hall | Aug. 10, 1920 |
| 1,455,105 | Butcher | May 15, 1923 |